April 14, 1953  R. PORTE  2,634,988
WHEELED VEHICLE SUCH AS SEMITRAILERS
Filed Feb. 14, 1951  2 SHEETS—SHEET 1

Inventor
René Porte
By Robert E. Burns
Attorney

April 14, 1953 R. PORTE 2,634,988
WHEELED VEHICLE SUCH AS SEMITRAILERS
Filed Feb. 14, 1951 2 SHEETS—SHEET 2
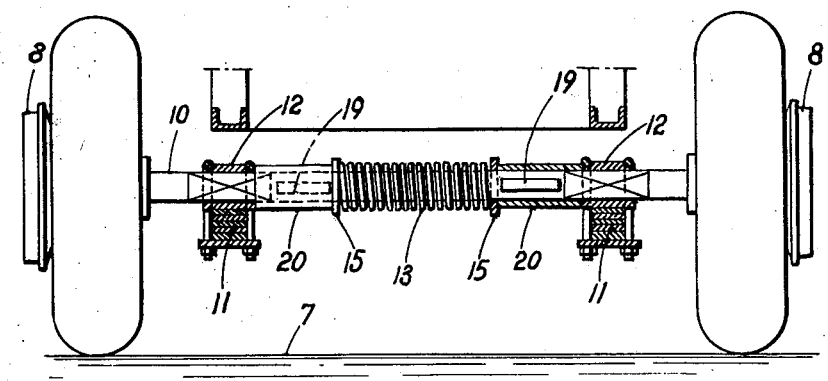
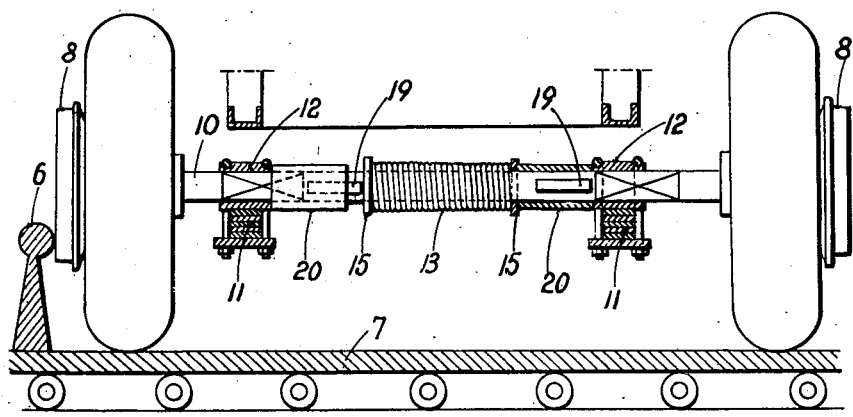
Inventor
René Porte
By Robert E. Burns
Attorney Patented Apr. 14, 1953

2,634,988

UNITED STATES PATENT OFFICE 2,634,988

WHEELED VEHICLE SUCH AS SEMITRAILERS

René Porte, Paris, France, assignor to Societe pour l'Union des Transports Ferroviaires et Routiers (U. F. R.), Paris, France, a corporation of France Application February 14, 1951, Serial No. 210,833
In France February 17, 1950

5 Claims. (Cl. 280—81).

This invention relates to wheeled vehicles such, for example, as semi-trailers and where herein the term "wheeled vehicle" is employed it is deemed to include wheeled containers.

For the purpose of facilitating the loading on to a transporting medium, such as a railway wagon, of wheeled loads such as containers and trailers, such loads have been provided with auxiliary rims with flanges or wheels with flanges, so that they can roll over rails placed longitudinally on the bottom of the wagon. Centring devices situated in front of a wagon to be loaded facilitate the movement of the vehicle wheels on to the rails on the bottom of the wagon.

When a semi-trailer with one axle has to be loaded on to a railway wagon by moving the trailer in reverse on to the wagon the centring device by co-operation with auxiliary flanged rims on the wheels of the trailer permits errors of direction, due to lack of precision associated with driving in reverse, to be automatically corrected so that the wheels of the vehicle are aligned with the rails on the bottom of the wagon.

When the axle of the trailer is centred it is easier for the tractor, which is backing the trailer, so to manoeuvre that the trailer is guided on to the wagon by means of the auxiliary rims, and this procedure has been commonly carried out without difficulty for many years.

If, however, the trailer is fitted with two wheel axles the wheels of which are provided with auxiliary flanged rims, difficulties are encountered because if the centring device is arranged so as to centre the second of the two axles, it will not be able to centre the first without the necessity of first laterally displacing the tractor. This, as will be understood, is practically impossible because of the lever arm and the considerable forces which would be involved.

It will, therefore, be understood that a two axled trailer cannot be properly loaded on to a wagon unless when it is reversed it is accurately aligned with the axis of the wagon and this can be done only by the use of exceptional skill on the part of the tractor driver.

The main object of the present invention is so to construct a two axled wheeled vehicle adapted to be loaded on to a transporting machine, such as a railway wagon, that the loading on to the transporting medium can be easily effected irrespective of the skill of the tractor driver.

According to the present invention there is provided a wheeled vehicle, e. g. a semi-trailer, having two wheel axles and means associated with the vehicle for engagement with guide means adapted to assist in centring the vehicle with respect to a transporting medium such as a railway wagon while the vehicle is being wheeled on to the transporting medium, characterised in that one of said axles is slidable axially from its normal position relative to the chassis of the vehicle within predetermined limits on the application of a force applied thereto in a direction tending to move the axle lengthwise of its axis and restoring means is provided to restore the axle to said normal position when such force ceases to act thereon.

In one embodiment of the invention the axle is slidable axially in bearings fixed to the suspension means for the vehicle chassis, the axle having thrust members secured thereto for movement therewith in the direction of its axis, said thrust members being located between said bearings and secured to the axle to be equi-distant from the mid-point thereof, considered in relation to the position normally occupied by the axle relative to the longitudinal centre line of the vehicle, and to co-operate with washers fitted round the axle to engage the opposite ends of a stressed spring located therebetween, said washers being movable relative one to the other lengthwise of the axis of the axle and urged by the spring towards abutment members therefor supported in fixed relation at positions equidistant from said vehicle centre line, the arrangement being such that on the application of a force applied to the axle in a direction tending to move it lengthwise of its axis one of said thrust members moves the washer associated therewith relatively to the other so that the spring acts to restore the axle to its normal position relative to the vehicle when said force ceases to act thereon, and if desired the thrust members may comprise bushes slidable in sleeves concentric therewith, the sleeves being supported by links connected thereto and to the vehicle chassis.

However, it may happen in certain cases that owing to sinking of the suspension springs, the chassis becomes near to the axle in which event a certain degree of play may form between the abutments and the washers. While this play cannot be great it may be such as to detract from the road holding capacity of the vehicle.

To avoid this play effect, in a further embodiment of the invention, the abutment members comprise distance pieces abutting the bearings for the axle and the thrust members are slidable in grooves formed in the distance pieces.

In order that the invention may be clearly understood two embodiments thereof will now be described by way of example with reference to the accompanying diagrammatic drawings in which:

Fig. 4 is a view, partly in section, showing an alternative axle arrangement on a vehicle according to the invention, and Fig. 5 is a view similar to Fig. 4, the axle being shown in the off-centre position with respect to the vehicle chassis.

Figure 1:
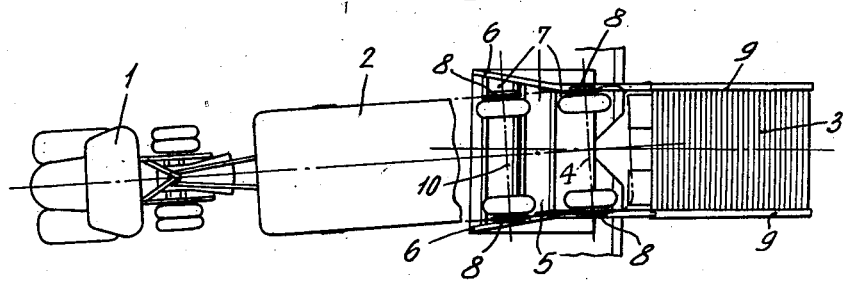
Fig. 1 is a plan illustrating a tractor in the process of loading a trailer unit to a railway wagon.

Referring to the drawings, Fig. 1 shows a tractor 1 loading, in reverse, a semi-trailer 2 having two axles, on to a railway wagon 3 at the instant when the second axle 4 has been centred with respect to the wagon by a centring device 5 comprising lateral guides 6 and movable platforms 7.

The wheels of the trailer are provided with auxiliary rims having flanges 8 intended to enable them to roll on to rails 9 fixed on the bottom of the railway wagon.

It will be observed from this figure that if the first axle 10 was fixed with respect to the second the tractor would not be able to straighten the trailer before the auxiliary rim of the left wheel came against the guide of the centring device thus jamming the tractor trailer unit.

If, on the other hand, the axle 10 is able to move axially following the guide and by reason of the movable platform on which it runs, the trailer can continue to reverse and the tractor thus have time to straighten up.

Figure 2:
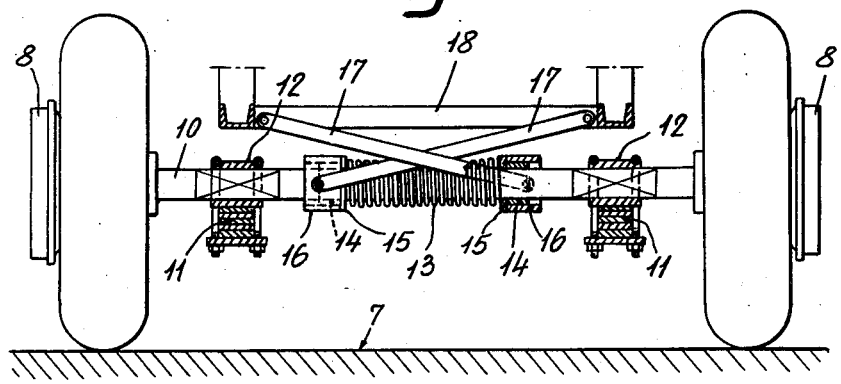
Fig. 2 is a view, partly in section, showing the arrangement of an axle on a vehicle according to the invention.
Figure 3:
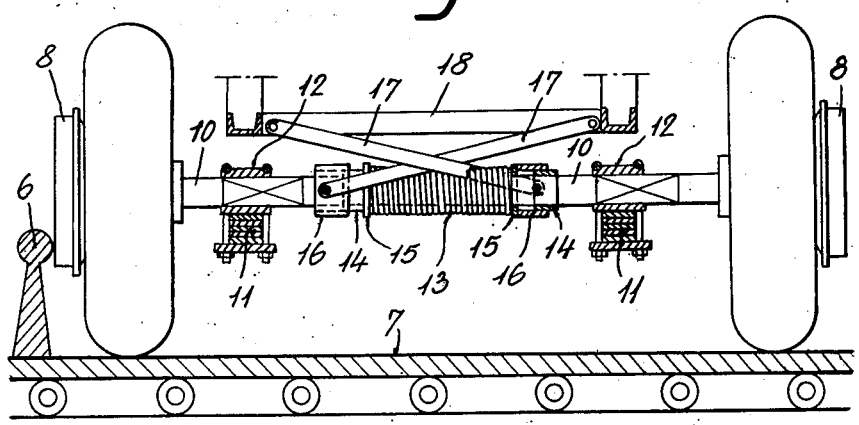
Fig. 3 is a view similar to Fig. 2, the axle being shown in the off-centre position with respect to the vehicle chassis.

In one embodiment of the invention, to enable the axle to move axially there is employed the construction shown in Figures 2 and 3.

The axle, which is preferably of square section, is supported by suspension springs 11 and is mounted in bearings shown as by means of collars 12 and in which it may slide axially.

A compression spring 13 surrounds the axle and is partly stressed between two thrust members shown as bushes 14 fixed on the axle to be equi-distant from its centre, that is in relation to the longitudinal centre line of the trailer. The ends of the spring engage washers 15 and tend to move them towards and against abutment members 16 so spaced relative to each other that the distance between them corresponds to that between the bushes 14. The abutment members 16 are supported by means of tie rods 17 of equal length each tie rod being pivoted at one end on an abutment member and at the other on the chassis 18 of the trailer.

The bushes 14 are slidable axially in abutment members 16 but the washers 15 are stopped by these latter members although being mounted for movement relative one to the other lengthwise of the axis of the axle.

The device above described operates in the following manner:

When the axle 10 undergoes no transverse force (Figure 2), it is not displaced laterally, being retained in this, its normal, position by the normal stress in the spring 13.

When the axle is acted upon by a transverse force, for example by reason of the pressure of one of the guides of the centring device on one of the auxiliary rims (Figure 3), the axle slides through the collars 12.

The bush 14 on the side from which the force acts slides through the abutment member associated therewith and further compresses the spring 13 through the washer against which it bears, the other end of the spring being held against the opposite washer which is abutting the abutment member through which the other bush slides freely.

When the transverse force ceases to act the axle takes up its normal position under the action of the compressed spring 13.

Referring to the alternate embodiment of the invention shown in Figs. 4 and 5, it will be observed that the axle 10 is slidable in bearings 12 as described above.

A coil spring 13 surrounds the axle and is normally held in a partly compressed state by means of washers 15 between thrust members 19 which are fixed to the axle. Between distance pieces 20 which abut against the bearings 12, there is a space equal to that between the thrust members 19 so that in the normal position of the arrangement illustrated (Fig. 4) the washers 15 engage both the thrust members 19 and the distance pieces 20.

In operation, when a guide such as rail 6 bears against the flange 8 of a wheel it forces the axle transversely, the latter compresses the spring 13 through one of the washers 15 acted upon by its associated thrust member 19, while the other washer 15 is held in place by its associated distance piece 20 thus preventing any displacement of the spring on this side.

When the transverse force ceases to act the spring 13, as described above, returns the axle to its normal position.

The abutment members 19 are slidable in grooves formed in the distance pieces 20 these grooves preferably taking the form of key slots.

I claim:

1. In a road vehicle adapted to be loaded on railroad cars and like carrying vehicles having longitudinal guiding means for receiving the road vehicle, in combination, a chassis, a fixed axle secured to said chassis, spaced apart bearings secured to said chassis and disposed under said chassis symmetrically to the axis thereof, an axially movable axle supported in said bearings and slideable in said bearings in response to lateral thrusts exerted at an end thereof, abutment members fixed to said axle in spaced apart relationship between said bearings, a spring surrounding the axle between said abutment members, and stop means limiting outward axial movement of said spring, but allowing free axial movement of said axle and said abutment members, whereby said spring normally holds said axle in predetermined position in said bearings but permits resilient axial displacement of said axle with concurrent compression of said spring in response to lateral thrusts imposed upon said axle, returning said axle to its original position in said bearings upon cessation of said thrusts.

2. A load vehicle as defined in claim 1, wherein said abutment members comprise annular elements secured to said movable axle and said stop means comprise sleeves normally enclosing said annular elements.

3. A load vehicle as defined in claim 1, wherein said stop means comprise sleeves connected to said chassis.

4. A load vehicle as defined in claim 3, wherein said sleeves are connected to the chassis by rods, each of which is connected to the chassis on one side and to the sleeve on the opposite side of the chassis, whereby said rods are transversely crossed.

5. A road vehicle as defined in claim 1, wherein said stop members comprise sleeves slidably mounted upon said axle and held against axially outward movement by said bearings.

RENÉ PORTE.

References Cited in the file of this patent

UNITED STATES PATENTS

| Number | Name | Date |
|---|---|---|
| 1,857,234 | Buquor | May 10, 1932 |